(12) United States Patent
Stanfield et al.

(10) Patent No.: US 7,093,872 B2
(45) Date of Patent: Aug. 22, 2006

(54) GOLF CART TRUNK

(76) Inventors: Robert L. Stanfield, 1580 Pine Valley Dr., Unit #317, Ft. Myers, FL (US) 33907; Paul H. Wylie, 1580 Pine Valley Dr., Unit #211, Ft. Myers, FL (US) 33907

( * ) Notice: Subject to any disclaimer, the term of this patent is extended or adjusted under 35 U.S.C. 154(b) by 1 day.

(21) Appl. No.: 10/957,863

(22) Filed: Oct. 4, 2004

(65) Prior Publication Data

US 2006/0071044 A1   Apr. 6, 2006

(51) Int. Cl.
*B60R 5/04* (2006.01)
(52) U.S. Cl. .................... 296/37.1; 296/80; 180/908; 280/DIG. 5; 224/274
(58) Field of Classification Search ............... 296/37.1, 296/76, 77.1, 79, 80; 180/89.1, 908; 280/DIG. 5; 224/274, 488, 539
See application file for complete search history.

(56) References Cited

U.S. PATENT DOCUMENTS

| 2,086,091 | A |   | 7/1937 | Payette |
| 2,992,040 | A |   | 7/1961 | Groth et al. |
| 3,977,720 | A |   | 8/1976 | Schreiberg |
| 5,069,481 | A | * | 12/1991 | Strange ................ 280/DIG. 5 |
| 5,213,364 | A | * | 5/1993 | Theckston ............ 280/DIG. 5 |
| 5,429,290 | A | * | 7/1995 | Greene, Jr. ................ 224/274 |
| 5,823,605 | A |   | 10/1998 | Seargeant |
| 6,068,325 | A | * | 5/2000 | Hughes ................ 280/DIG. 5 |
| 6,220,647 | B1 |   | 4/2001 | Winkler |
| 6,227,603 | B1 |   | 5/2001 | Brock |
| 6,293,610 | B1 | * | 9/2001 | Howard ................ 280/DIG. 5 |
| 6,416,109 | B1 |   | 7/2002 | Tyrer et al. |
| 6,641,192 | B1 | * | 11/2003 | Eschenfelder ............ 296/37.1 |
| 6,709,043 | B1 | * | 3/2004 | Beusse et al. ......... 280/DIG. 5 |
| 6,874,838 | B1 | * | 4/2005 | De Gaillard ................ 296/76 |
| 2005/0279541 | A1 | * | 12/2005 | Peters ...................... 180/65.1 |

FOREIGN PATENT DOCUMENTS

DE         4010241    *  4/1991

* cited by examiner

*Primary Examiner*—Jason Morrow
(74) *Attorney, Agent, or Firm*—The Livingston Firm; Edward M. Livingston; Angela M. Miller (57) ABSTRACT

A golf cart trunk has a trunk enclosure (1) affixed to at least one support component (2) proximate aft of a seat (3) of a golf cart (4). The trunk enclosure includes a predetermined door (7) that is openable, closable and lockably closed with a lock (32).

22 Claims, 8 Drawing Sheets

FIG. 17

GOLF CART TRUNK

BACKGROUND OF THE INVENTION

This invention relates to lockable trunks on golf carts for carrying golf bags and golfing paraphernalia safely from theft and adverse weather.

Golf cart covers for sheltering golf bags and golfing paraphernalia on golf carts are well known. There are, however, no known golf cart trunks that are lockable for a reasonable likelihood of safety from theft of golf bags and golfing paraphernalia left unattended on golf carts and that also provide protection from weather elements in a manner taught by this invention.

Related but different prior art is known to include the following:

| Patent Number | Inventor | Date |
| --- | --- | --- |
| U.S. Pat. No. 2,086,091 | Payette | Jul. 6, 1937 |
| U.S. Pat. No. 2,992,040 | Groth et al. | Jul. 11, 1961 |
| U.S. Pat. No. 3,977,720 | Schreiberg | Aug. 31, 1976 |
| U.S. Pat. No. 5,069,481 | Strange | Dec. 3, 1991 |
| U.S. Pat. No. 5,823,605 | Seargeant | Oct. 20, 1998 |
| U.S. Pat. No. 6,220,647 B1 | Winkler | Apr. 24, 2001 |
| U.S. Pat. No. 6,227,603 B1 | Brock | May 8, 2001 |
| U.S. Pat. No. 6,416,109 B1 | Tyrer et al. | Jul. 9, 2002 |

SUMMARY OF THE INVENTION

Objects of patentable novelty and utility taught by this invention are to provide a golf cart trunk which:

can be retrofitted onto or made part of golf carts;

fits behind seats of a golf cart for easy access;

can be made to hold up to four upright golf bags, pairs of golf shoes and other golfing paraphernalia selectively;

encloses golf bags and golfing paraphernalia with covering that is lockable and protective from unauthorized access and from unwanted elements of nature; and can be made to provide shade and shelter for users aft of the golf cart trunk.

This invention accomplishes these and other objectives with a golf cart trunk having a trunk enclosure that is articulated to be affixed to at least one predetermined golf cart component proximate aft of a seat of a predetermined class of golf carts. The trunk enclosure includes a predetermined door or lid that is openable, closable and lockable.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

A description of the preferred embodiment of this invention follows a list of numbered terms which designate its features with the same numbers on the drawings and in parentheses throughout the description and throughout the patent claims.

1. Trunk enclosure
2. Support component
3. Seat
4. Golf cart
5. Golf bag
6. Golfing shoes
7. Door
8. Floor
9. Slatted roll-up door
10. Slats
12. Slatted top end
13. Slatted bottom end
14. Trunk-aft bottom
15. Trunk-front top
16. Trunk-front wall
18. Hinge rods
19. Shingled slats
20. Slat-top sides
21. Slat-bottom sides
22. Trunk first side
23. Trunk second side
24. Vertical front edges
25. Slanted top edges
26. Guide channels
28. Rod extensions
29. Rollers
30. Door envelope
31. Lock base
32. Lock 33. Double door
34. First-side door
35. First doorway side
36. Second-side door
37. Second doorway side
38. Double-door lock
39. Trunk-top cover
40. Top-cover hinge
41. Cover overhangs
42. Uplift door
43. Hinged top
44. Uplift bottom
45. Door roof
46. Extended uplift door
47. Aesthetic covering Referring to FIGS. 1–8, the golf cart trunk has a trunk enclosure (1) articulated for being affixed predeterminedly to at least one predetermined support component (2) aft of a position for a seat (3) of a golf cart (4) of a predetermined class of golf carts. The trunk enclosure (1) is articulated to contain at least one golf bag (5) in an upright orientation and at least one pair of golfing shoes (6) positioned selectively in the trunk enclosure (1).

Numerous support components (2) are known for after-market attachment of the trunk enclosure (1) to differing classes, styles and manufacturer makes of golf carts. Some are seat supports. Some are roof supports. Some are suitable for direct attachment. Others require adaptation. Some are near a golf cart floor. Others are near heights of tops of seats. Some support components (2) must be made and attached to a golf cart (4) that may not have a support component (2) that is suitable for either direct attachment or for modification for after-market attachment or retrofit.

Any golf cart (4) can be manufactured to include a suitable support component (2) as original equipment.

A support component (2) feature is intended to include any existing, add-on modification or originally manufactured support component (2) with which the trunk enclosure (1) can be attached to any golf cart (4) suitably aft of a golf cart seat (3).

Representative of foreseeable support components (2) for illustration of this invention is a rod oriented either horizontally or vertically and designated support component (2) in the drawings.

The trunk enclosure (1) has a predetermined door (7) that is articulated for being opened, closed and locked predeterminedly. The trunk enclosure (1) and the door (7) are made preferably of material selected for predetermined protection of contents of the trunk enclosure (1) from unauthorized access and from unwanted natural elements.

Figure 6:
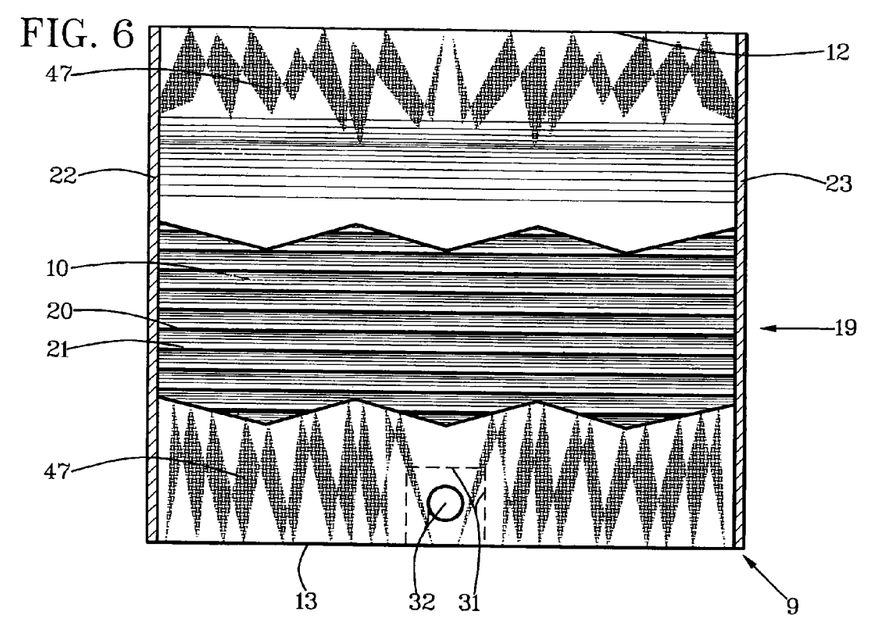
FIG. 6 is a partially cutaway rear view of the trunk enclosure with the slatted roll-up door in a rolled-down shut mode and having a plurality of slats juxtaposed from-side-to-side and having aesthetic covering.

Aesthetic covering (47) can be positioned on the door (7).

The trunk enclosure (1) has a floor (8) for supporting the golf bag (5) and a predetermined lock (32) articulated for locking the predetermined door (7) shut.

The lock (32) can include a lock base (31) disposed oppositely from the lock (32) on the door (7) for receiving the lock (32) predeterminedly.

The trunk enclosure (1) can be articulated for containing a predetermined plurality of the golf bags (5) in the upright position and for containing a predetermined plurality of the golfing shoes (6) positioned selectively in the trunk enclosure (1).

Figure 1:
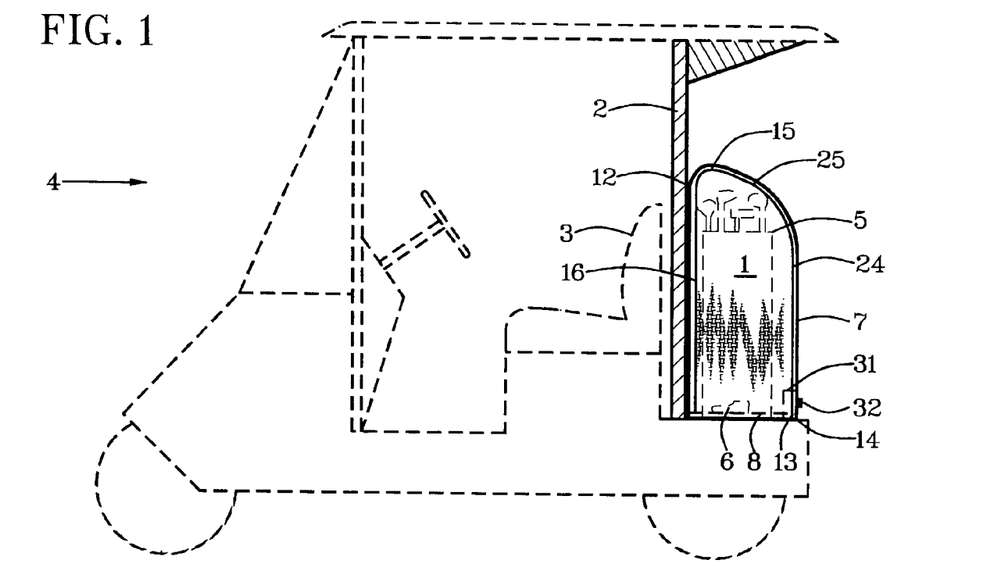
FIG. 1 is a side view of a golf cart shown in dashed lines with a trunk enclosure containing golf bags and golfing paraphernalia behind a seat and having a slatted roll-up door.
Figure 2:
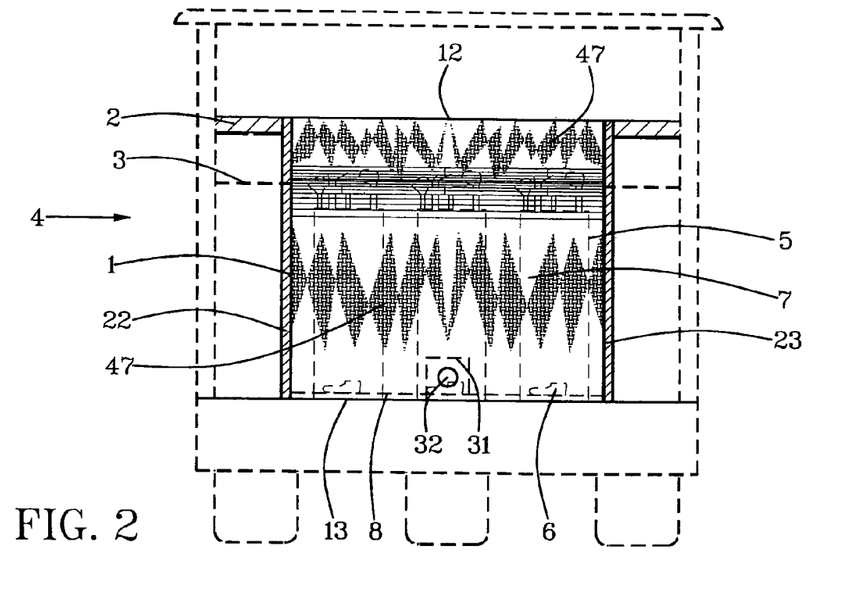
FIG. 2 is a rear view of the FIG. 1 illustration.
Figure 3:
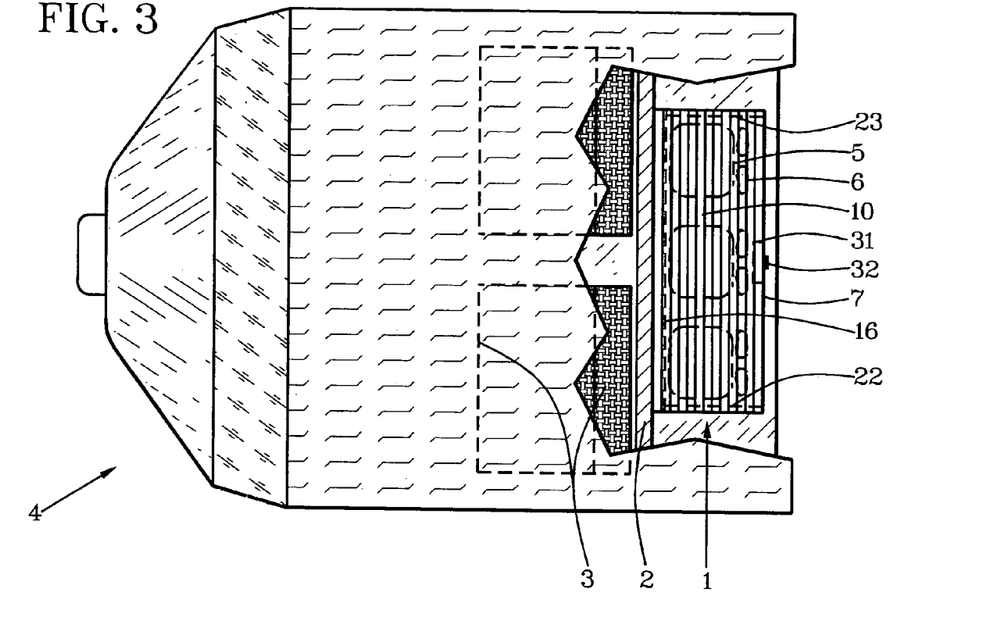
FIG. 3 is a top view of the FIG. 1 illustration.
Figure 4:
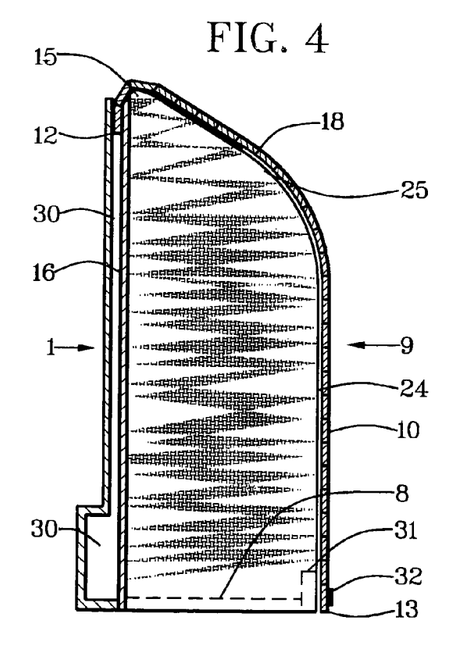
FIG. 4 is an enlarged side view of the trunk enclosure with the slatted roll-up door in locked-shut mode.
Figure 5:
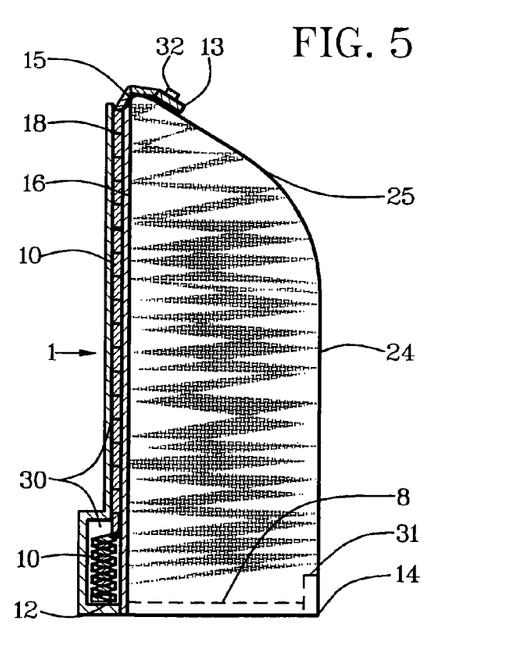
FIG. 5 is the FIG. 4 illustration with the slatted roll-up door in a rolled-up open mode.

The door (7) can include a slatted roll-up door (9), which also may be referred to as a slide-up door, having slats (10) juxtaposed horizontally and hinged together sequentially with predetermined slat hinges intermediate a slatted top end (12) and a slatted bottom end (13) of the slatted roll-up door (9). The slatted roll-up door (9) is articulated for the slatted bottom end (13) being raised or slid up from a trunk-aft bottom (14) and rolled over a trunk-front top (15) with the slatted top end (12) being rolled down adjacently to a trunk-front wall (16) for accessing items in the trunk enclosure (1) and for accessing items in the at least one golf bag (5) from tops and sides thereof.

Figure 7:
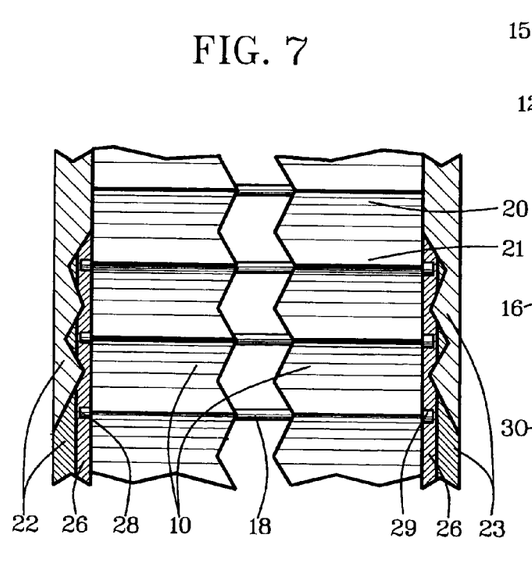
FIG. 7 is a partially cutaway fragmentary enlarged rear view of slats of the slatted roll-up door having optional hinge-rod extensions on one side and rollers on an opposite side of the trunk enclosure with the opposite sides having guide channels for receiving the hinge-rod extensions and the rollers as door guides.

The slats (10) can include hinge loops interspersed oppositely proximate opposite sides of the slats (10) predeterminedly for receiving hinge rods (18) parallel to and intermediate the slats (10). The hinge rods (18) are positioned in the hinge loops as slat hinges.

The slats (10) preferably include shingled slats (19) having slat-top sides (20) and slat-bottom sides (21). The slat-top sides (20) are articulated for extending over the slat-bottom sides (21) with the slat-bottom sides (21) being articulated for extending under the slat-top sides (20) in a closed-down mode of the slatted roll-up door (9).

The hinge rods (18) are extended predeterminedly intermediate first ends and second ends of the slats (10).

The slats (10) can include widths intermediate the slat-top sides (20) and the slat bottom sides (21) articulated for positioning the hinge rods (18) predeterminedly close together for deterring unwanted breaking and entering by breaking the slats (10) which can be made of predeterminedly low-weight material.

Figure 8:
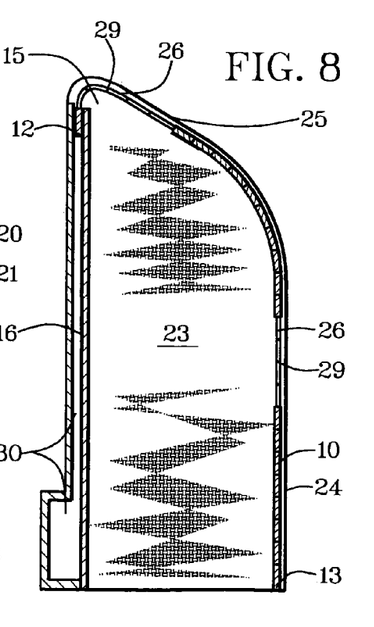
FIG. 8 is a partially cutaway side view of the trunk enclosure having the slatted roll-up door in a rolled-down shut mode and having cutaway portions of the slatted roll-up door cutaway for showing the guide channels.
Figure 9:
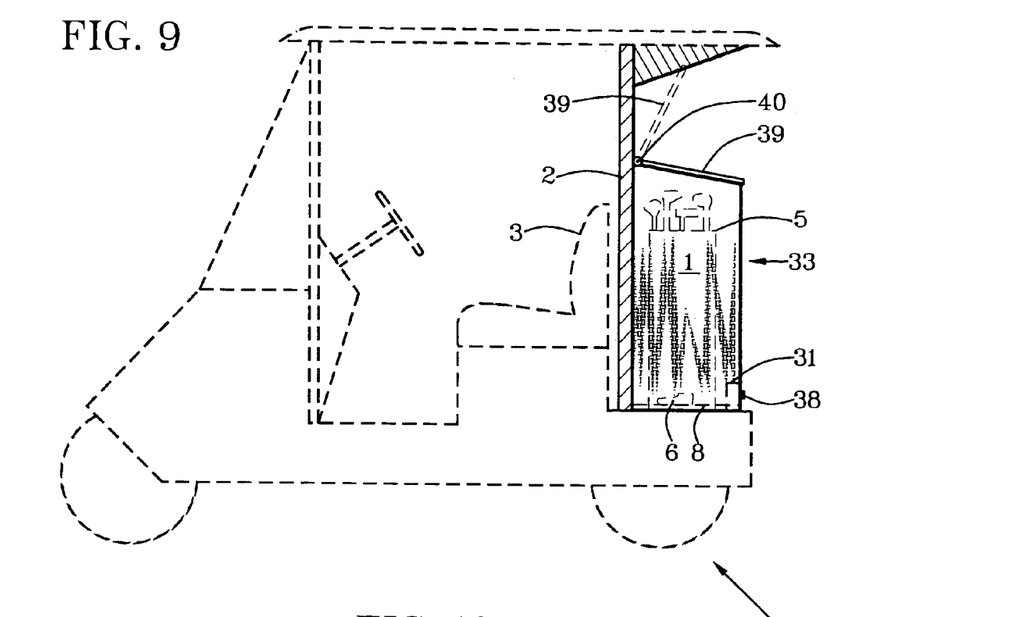
FIG. 9 is a side view of a golf cart shown in dashed lines with a trunk enclosure having a double door and containing a golfbag and golfing paraphernalia behind a seat.
Figure 10:
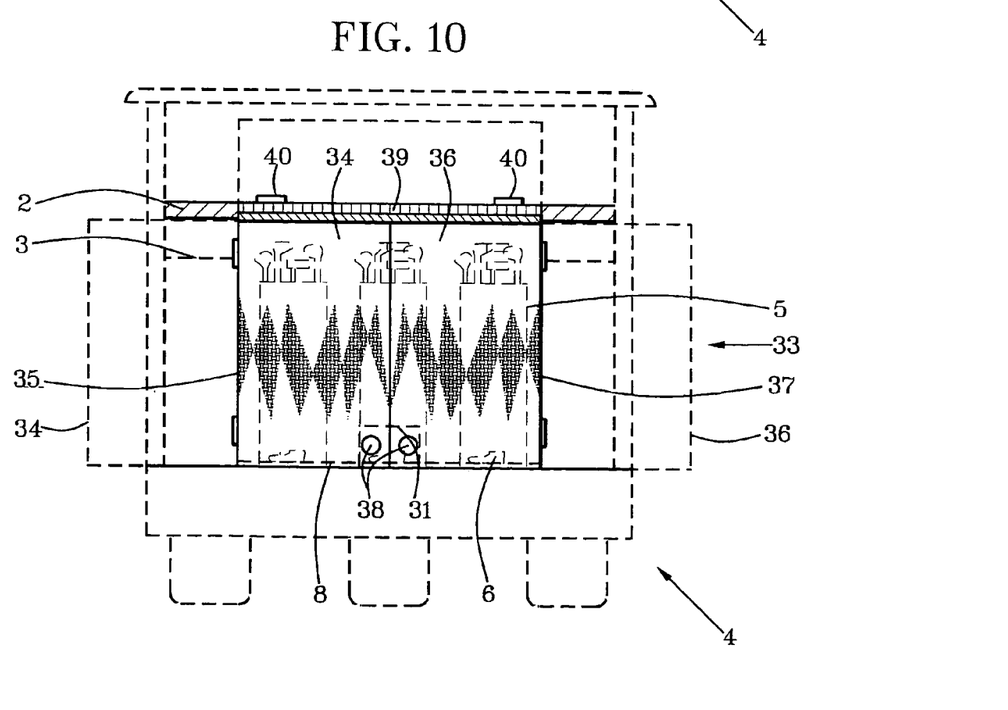
FIG. 10 is rear view of the FIG. 9 illustration.

The trunk enclosure (1) includes a trunk first side (22) and a trunk second side (23). The trunk first side (22) and the trunk second side (23) include predeterminedly vertical front edges (24) and slanted top edges (25) articulated for supporting vertical positioning of the slatted roll-up door (9) across a front of the trunk enclosure (1) and having roof-slanted positioning of the slatted roll-up door (9) across a top of the trunk enclosure (1).

As shown in FIGS. 7–8, the vertical front edges (24) and slanted top edges (25) can include guide channels (26) articulated for receiving door guides extended from ends of the hinge rods (18). The door guides can include rod extensions (28) articulated and positioned for sliding in the guide channels (26). Optionally, the door guides can include rollers (29) articulated and positioned on the hinge rods (18) for rolling in the guide channels (26).

As shown in FIGS. 4–5 and 8, a door envelope (30) can be provided for receiving a rolled-up portion of the slatted roll-up door (9) proximate the trunk front wall (16). The door envelope (30) can include an enlarged bottom portion for receiving a roof portion of the slats (10) which are in excess of an amount thereof for only a vertical portion of the slatted roll-up door (9).

Referring to FIGS. 9–13, the door (7) can include a double door (33) having a first-side door (34) hinged vertically to a first doorway side (35) and a second-side door (36) hinged vertically to a second doorway side (37).

A double-door lock (38) is articulated and positioned for locking the double door (33) shut.

Figure 11:
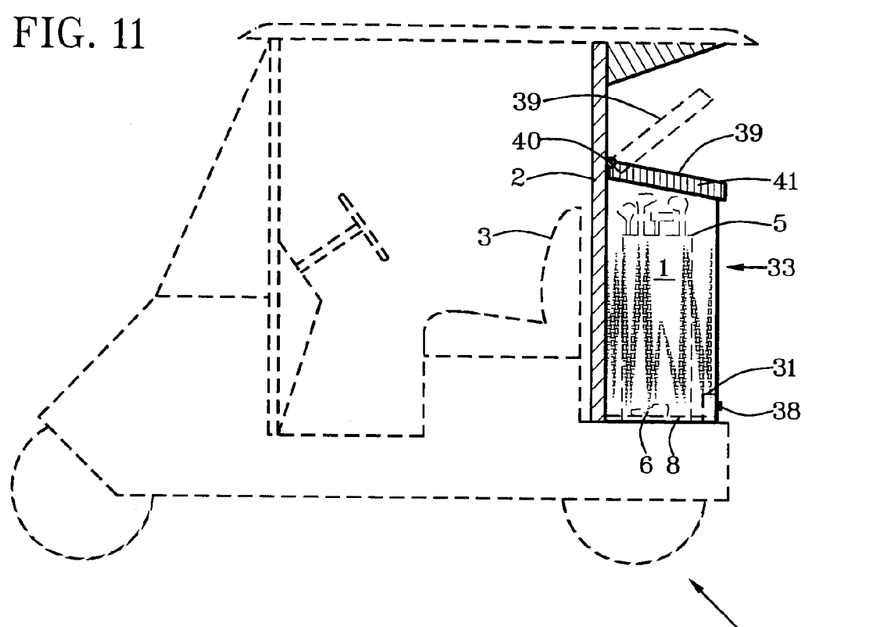
FIG. 11 is the FIG. 9 illustration with a trunk cover having cover overhangs.
Figure 12:
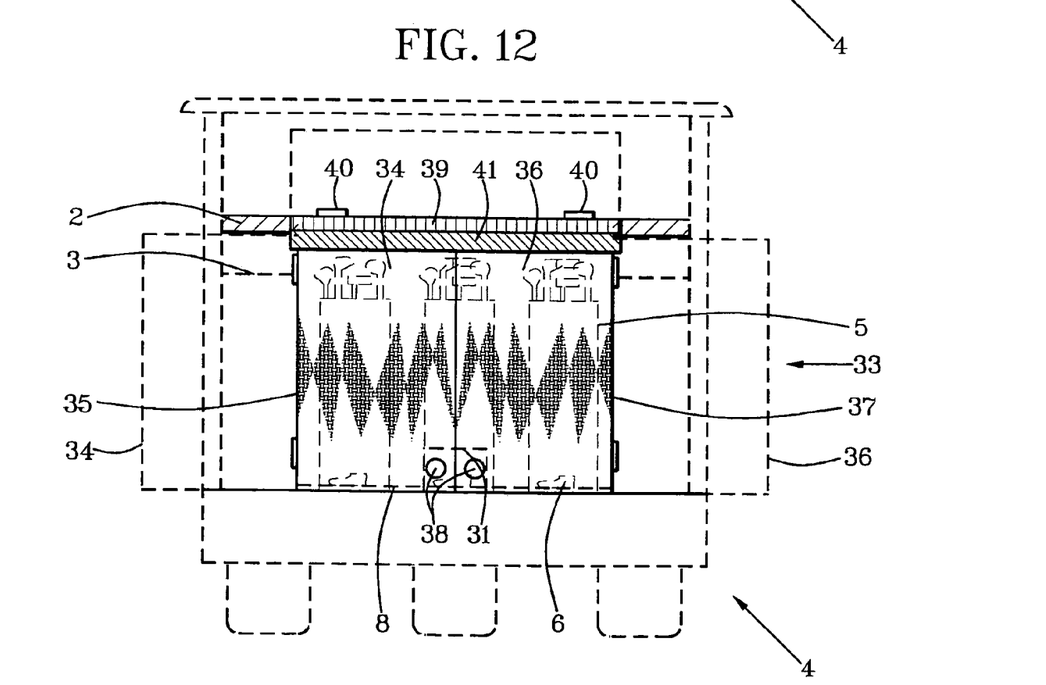
FIG. 12 is a rear view of the FIG. 11 illustration.
Figure 13:
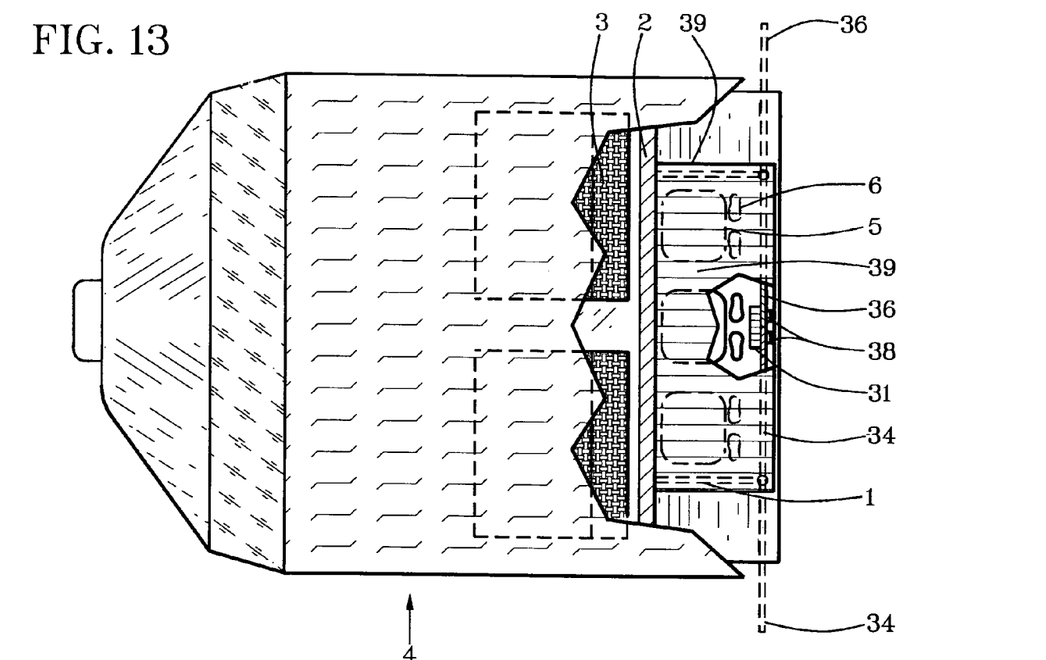
FIG. 13 is a top view of the FIG. 11 illustration.
Figure 14:
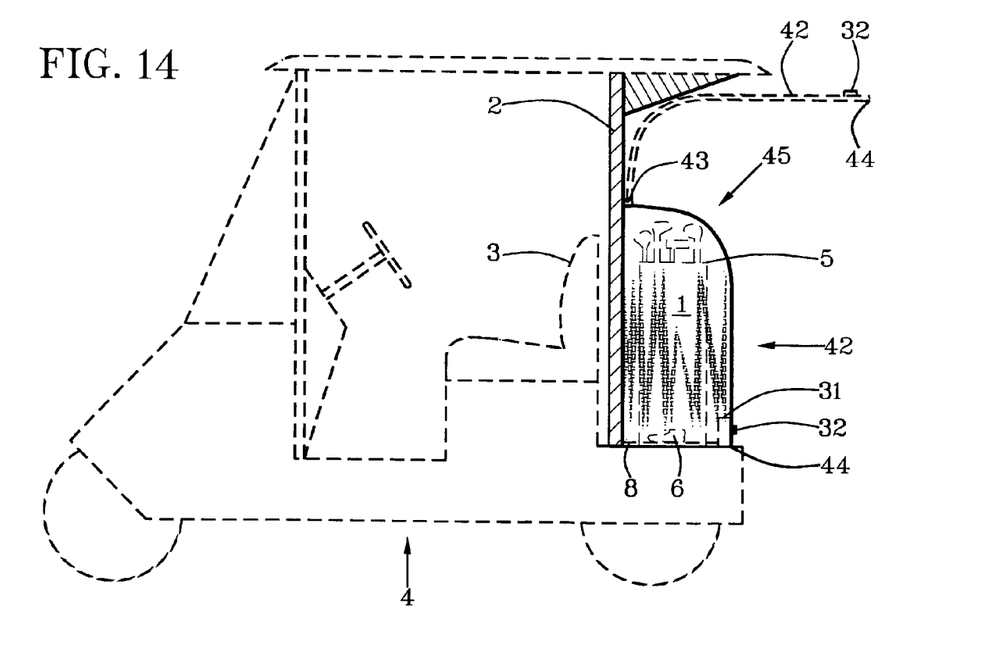
FIG. 14 is a side view of a golf cart shown in dashed lines with a trunk enclosure containing a golf bag and golfing paraphernalia behind a seat and having an uplift door.
Figure 15:
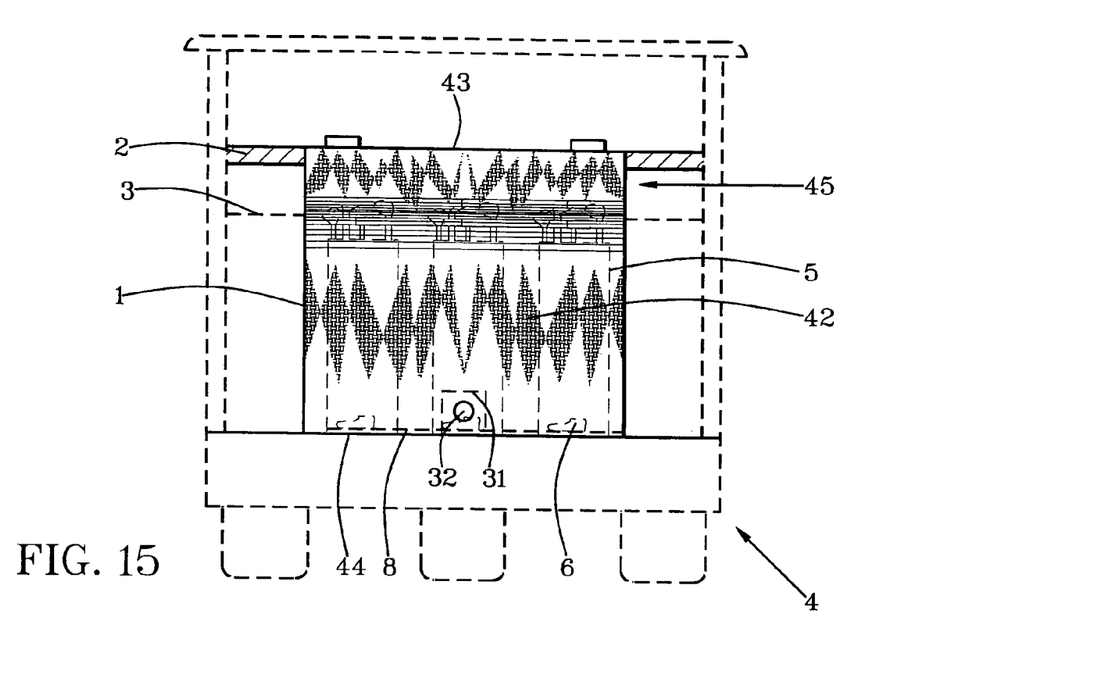
FIG. 15 is a rear view of the FIG. 14 illustration.

A trunk-top cover (39) can be hinged to a predetermined top portion of the trunk enclosure (1) with a top-cover hinge (40) for pivoting the trunk-top cover (39) upwards to proximate verticality to allow vertical access to the trunk enclosure (1). The trunk-top cover (39) can be pivoted downward to proximate horizontality to deter unwanted vertical access to the trunk enclosure (1) and to deter vertical entry of unwanted natural elements into the trunk enclosure (1) and into the at least one golf bag (5).

The top-cover hinge (40) can be articulated for being spring-pressured to verticality orientation of the trunk-top cover (39) for non interference of the trunk-top cover (39) with side access and top access to the trunk enclosure (1) in an open mode.

The trunk-top cover (39) can include cover overhangs (41) articulated for overhanging top edges of the double door (33) and top edges of the trunk enclosure (1) for deterring unwanted top-side entry into the trunk enclosure (1) in a closed mode.

Referring to FIGS. 14–17, the door (7) can include an uplift door (42) having a hinged top (43) and an uplift bottom (44). The hinged top (43) is hinged to a predetermined top portion of the trunk enclosure (1) for vertical uplift of the uplift bottom (44).

The uplift bottom (44) is lockable to the lock base (31).

The uplift door (42) can include a door roof (45) oriented downwardly and rearwardly from a predetermined top portion of the trunk enclosure (1).

Figure 17:
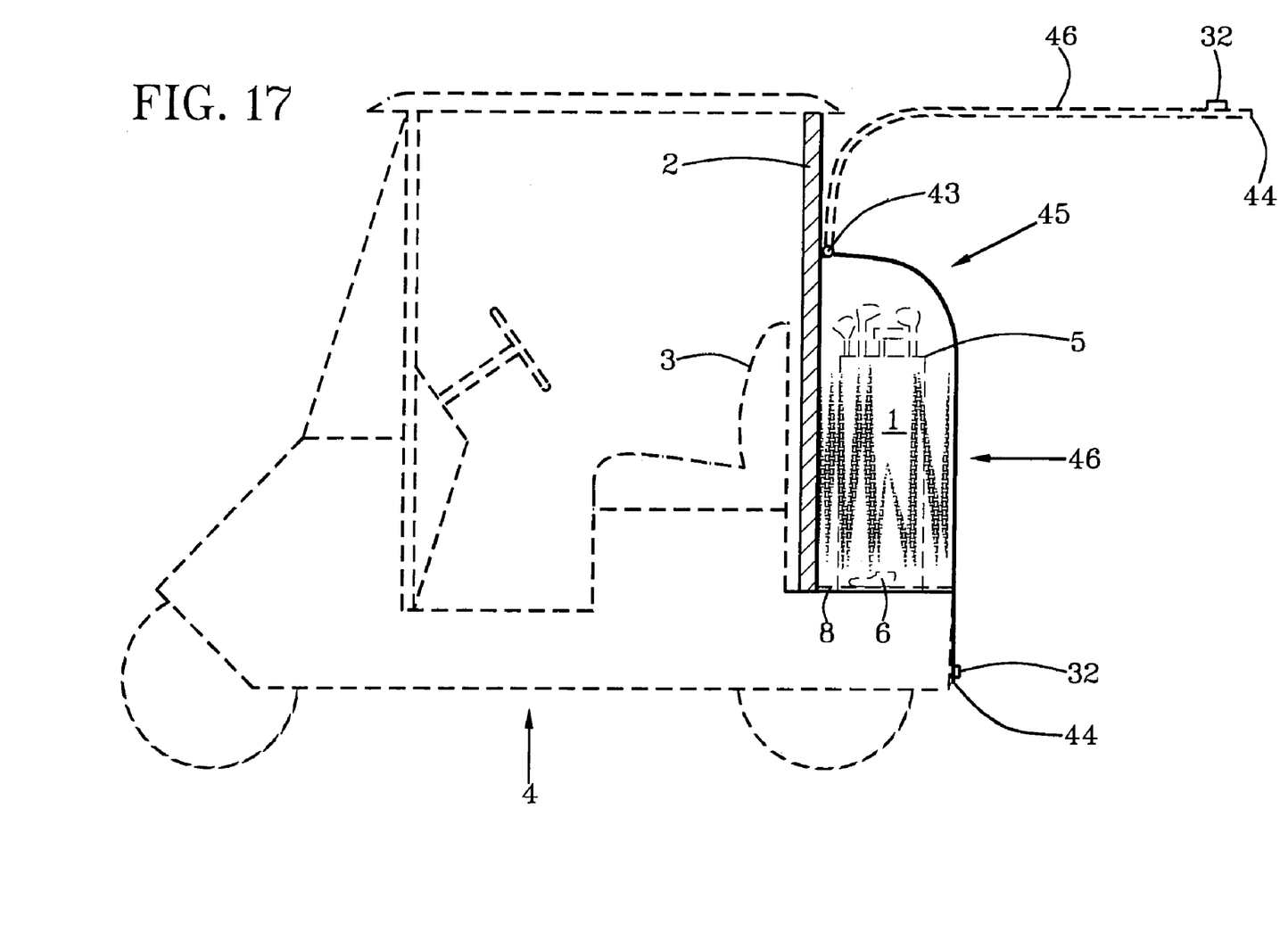
FIG. 17 is the FIG. 14 illustration having the uplift door extended for shade and weather protection for a user accessing the trunk enclosure and waiting out rain showers aft of the golf cart.

The hinged top (43) can include resilience-pressured pivot of the uplift door (42) to predetermined horizontality in an uplifted-open mode.

The door (42) is articulated and positioned on the trunk enclosure (1) for providing predetermined shade and shelter aft of the golf cart (4) with the uplift door (42) being up in the uplifted-open mode.

Figure 16:
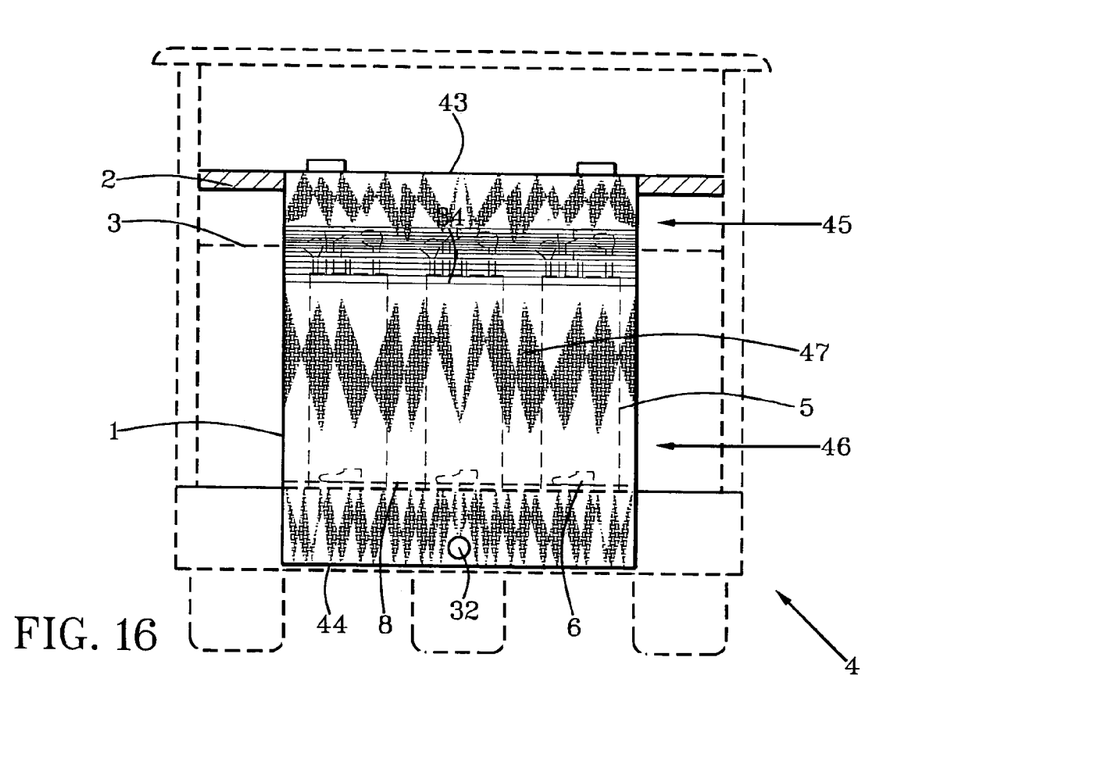
FIG. 16 is the FIG. 15 illustration having the uplift door extended downwardly below a trunk floor.

The uplift door (42) can include articulation for an extended uplift door (46) with the uplift bottom (44) extended downward below the floor (8) for enhancing shade and shelter aft of the golf cart (4) with increased length in the uplifted-open mode.

A new and useful golf cart trunk having been described, all such foreseeable modifications, adaptations, substitutions of equivalents, mathematical possibilities of combinations of parts, applications and forms thereof as described in the following claims and not precluded by prior art are included in this invention.

What is claimed is:

1. A golf cart trunk comprising:
a trunk enclosure articulated for being affixed predeterminedly to at least one predetermined support component aft of a position for a seat of a golf cart of a predetermined class of golf carts;
the trunk enclosure being articulated to contain at least one golf bag in an upright orientation;
the trunk enclosure having a predetermined door that is articulated for being opened, closed and locked predeterminedly;
the trunk enclosure and the door being made of material selected for predetermined protection of contents of the trunk enclosure from unauthorized access and from unwanted natural elements;
the trunk, enclosure having a floor for supporting the golf bag;
a predetermined lock articulated for locking the predetermined door shut:
the door includes a slatted roll-up door having slats juxtaposed horizontally and hinged together sequentially with predetermined slat hinges intermediate a slatted top end and a slatted bottom end of the slatted roll-up door; and
the slatted roll-up door is articulated for the bottom end being raised up from a trunk-aft bottom and rolled over a trunk-front top with the slatted top end being rolled down adjacently to a trunk-front wall for accessing items in the trunk enclosure and for accessing items in the at least one golf bag from tops and sides thereof.

2. The golf cart trunk of claim 1 wherein:
the lock includes a lock base disposed oppositely from the lock on the door for receiving the lock predeterminedly.

3. The golf cart trunk of claim 1 wherein:
the trunk enclosure is articulated for containing a predetermined plurality of the golf bags in the upright position.

4. The golf cart trunk of claim 1 wherein:
the slats include shingled slats.

5. The golf cart trunk of claim 4 and further comprising:
the shingled slats include slat-top sides and slat-bottom sides; and
the slat-top sides are articulated for extending over the slat-bottom sides and the slat-bottom sides are articulated for extending under the slat-top sides in a closed-down mode of the slatted roll-up door.

6. The golf cart trunk of claim 5 and further comprising:
hinge rods extended predeterminedly intermediate first ends and second ends of the slats; and
the slats include widths intermediate the slat-top sides and the slat bottom sides articulated for positioning the hinge rods predeterminedly close together for deterring unwanted breaking and entering by breaking the slats which can be made of predeterminedly low-weight material.

7. The golf cart trunk of claim 6 wherein:
the trunk enclosure includes a trunk first side and a trunk second side; and
the trunk first side and the trunk second side include predeterminedly vertical front edges and slanted top edges articulated for supporting vertical positioning of the slatted roll-up door across a front of the trunk enclosure and roof-slanted positioning of the slatted roll-up door across a top of the trunk enclosure.

8. The golf cart trunk of claim 7 wherein:
the vertical front edges and slanted top edges include guide channels articulated for receiving door guides extended from ends of the hinge rods.

9. The golf cart trunk of claim 8 wherein:
the door guides include rod extensions articulated and positioned for sliding in the guide channels.

10. The golf cart trunk of claim 8 wherein:
the door guides include rollers articulated and positioned on the hinge rods for rolling in the guide channels.

11. The golf cart trunk of claim 10 and further comprising:
a door envelope articulated for receiving a rolled-up portion of the slatted roll-up door proximate the trunk front wall.

12. The golf cart trunk of claim 1 and further comprising:
a door envelope articulated for receiving a rolled-up portion of the slatted roll-up door proximate the trunk front wall.

13. A golf cart trunk comprising:
a trunk enclosure on a golf cart;
the trunk, enclosure being articulated to be affixed predeterminedly to at least one support component aft of a position for a seat of a golf cart of a predetermined class of golf carts;
the trunk enclosure having a predetermined door that is articulated for being opened, closed and locked predeterminedly;
the door includes the slatted roll-up door having the slats juxtaposed horizontally and hinged together sequentially with the predetermined slat hinges intermediate the slatted top end and the slatted bottom end of the slatted roll-up door; and the slatted roll-up door is articulated for the bottom end being raised up from the trunk-aft bottom and rolled over a trunk-front top with the slatted top end being rolled down adjacently to a trunk-front wall for accessing items in the trunk enclosure and for accessing items in the at least one golf bag from tops and sides thereof.

14. A golf cart trunk comprising:

a trunk enclosure on a golf cart;

the trunk enclosure being articulated for containing at least one golf bag aft of a position for a seat on the golf cart;

the trunk enclosure having a predetermined door that is articulated for being opened, closed and locked predeterminedly;

the door includes the slatted roll-up door having the slats juxtaposed horizontally and hinged together sequentially with the predetermined slat hinges intermediate the slatted top end and the slatted bottom end of the slatted roll-up door; and the slatted roll-up door is articulated for the bottom end being raised up from the trunk-aft bottom and rolled over a trunk-front top with the slatted top end being rolled down adjacently to a trunk-front wall for accessing items in the trunk enclosure and for accessing items in the at least one golf bag from tops and sides thereof.

15. The golf cart trunk of claim 14 wherein:

the slats include the shingled slats;

the shingled slats include the slat-top sides and the slat-bottom sides; and the slat-top sides are articulated for extending over the slat-bottom sides and the slat-bottom sides are articulated for extending under the slat-top sides in the closed-down mode of the slatted roll-up door.

16. The golf cart trunk of claim 15 and further comprising:

hinge rods extended predeterminedly intermediate first ends and second ends of the slats; and the slats include widths intermediate the slat-top sides and the slat bottom sides articulated for positioning the hinge rods predeterminedly close together for deterring unwanted breaking and entering by breaking the slats which can be made of predeterminedly low-weight material.

17. The golf cart trunk of claim 16 wherein:

the trunk enclosure includes the trunk first side and the trunk second side; and the trunk first side and the trunk second side include predeterminedly vertical front edges and slanted top edges articulated for supporting vertical positioning of the slatted roll-up door across the front of the trunk enclosure and roof-slanted positioning of the slatted roll-up door across atop of the trunk enclosure.

18. The golf cart trunk of claim 17 wherein:

the vertical front edges and slanted top edges include the guide channels articulated for receiving the door guides extended from ends of the hinge rods.

19. The golf cart trunk of claim 18 wherein:

the door guides include the rod extensions articulated and positioned for sliding in the guide channels.

20. The golf cart trunk of claim 19 wherein:

the door guides include the rollers articulated and positioned on the hinge rods for rolling in the guide channels.

21. The golf cart trunk of claim 20 and further comprising:

a door envelope articulated for receiving the rolled-up portion of the slatted roll-up door proximate the trunk front wall.

22. The golf cart trunk of claim 14 and further comprising:

a door envelope articulated for receiving the rolled-up portion of the slatted roll-up door proximate the trunk front wall.

* * * * *